United States Patent [19]

DiVincenzo

[11] Patent Number: 4,469,450
[45] Date of Patent: Sep. 4, 1984

[54] ELECTROACOUSTIC METHOD FOR NONDESTRUCTIVELY MONITORING THE INTERNAL TEMPERATURE OF OBJECTS

[75] Inventor: Costantino L. DiVincenzo, Parma, Ohio

[73] Assignee: The Firestone Tire & Rubber Company, Akron, Ohio

[21] Appl. No.: 383,426

[22] Filed: Jun. 1, 1982

[51] Int. Cl.³ .................... G01H 11/24; G01M 17/02
[52] U.S. Cl. ....................................... 374/119; 73/146
[58] Field of Search .................. 374/119, 117; 73/597, 73/146

[56] References Cited

U.S. PATENT DOCUMENTS

| 3,597,316 | 8/1971 | Lynworth | 374/119 |
| 3,745,460 | 7/1973 | Belzer et al. | 324/158 T |
| 3,934,452 | 1/1976 | Prevorsek et al. | 73/146 |
| 3,980,743 | 9/1976 | Smith | 264/40.2 |
| 3,981,175 | 9/1976 | Hammond et al. | 73/15 R |
| 4,027,524 | 6/1977 | Fletcher et al. | 73/15 R |
| 4,150,567 | 4/1979 | Prevorsek et al. | 73/146 |
| 4,271,708 | 6/1981 | Kohno et al. | 73/861.28 |
| 4,274,289 | 6/1981 | Weiss et al. | 73/618 |
| 4,285,235 | 8/1981 | Dugger | 73/146 |
| 4,297,876 | 11/1981 | Weiss | 73/146 |
| 4,327,579 | 5/1982 | Weiss | 73/146 |

FOREIGN PATENT DOCUMENTS 1587889 4/1981 United Kingdom .

OTHER PUBLICATIONS

Ludwig Bergmann, *Ultrasonics and Their Scientific and Technical Applications*, Chapter IV, pp. 161–188, (1946).
B. P. Holownia, *Effect of Carbon Black on Poisson's Ratio of Elastomers*, 48 Rubber Chemistry and Technology, pp. 246–253, (No. 2, 1975).

Primary Examiner—Donald O. Woodiel
Attorney, Agent, or Firm—Ernst H. Ruf

[57] ABSTRACT

A method for nondestructively monitoring the internal temperature of objects having poor thermal conductance, such as tires, includes the initial steps of determining the internal temperature of a reference object or a representative portion thereof at a plurality of internal temperatures (T), measuring a plurality of pulse propogation times ($t_T$) taken by an ultrasonic frequency pulse signal to propogate through the reference object or a representative portion thereof at the plurality of internal temperatures (T), and establishing a relationship between the determined plurality of internal temperatures (T) and the associated plurality of pulse propogation times ($t_T$). Thereafter the unknown internal temperature ($T_U$) of the object to be monitored may be found by measuring the pulse propogation time ($t_{TU}$) taken by an ultrasonic frequency pulse signal to propogate therethrough and determining the unknown internal temperature ($T_U$) from correlating the measured pulse propogation time ($t_{TU}$) at the unknown internal temperature ($T_U$) to the relationship. Where the propogation paths in the sample object and object to be monitored have significantly different lengths, the aforesaid relationship may be made independent of the dimensions of both objects.

12 Claims, 9 Drawing Figures

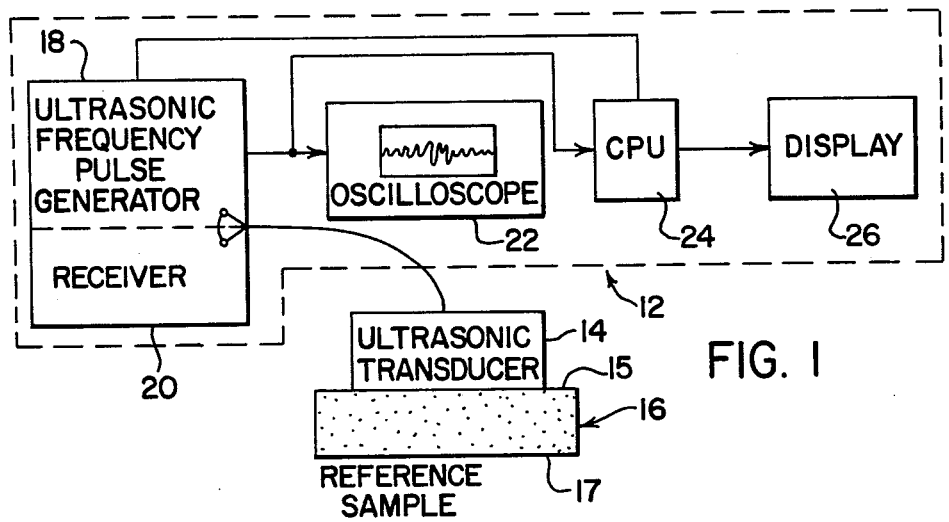
FIG. 1
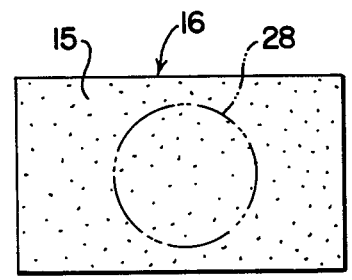
FIG. 2
FIG. 5
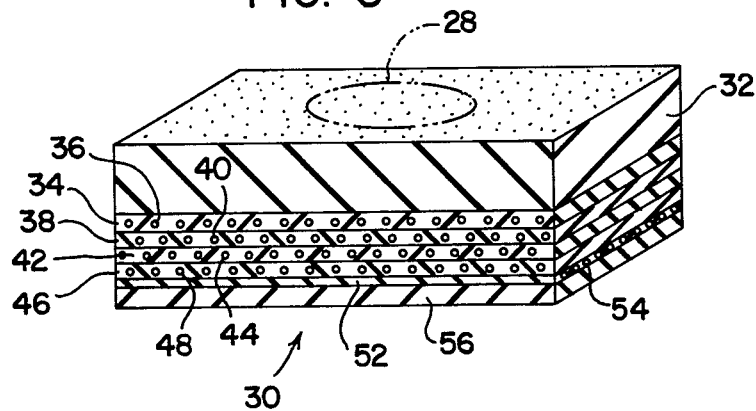

ELECTROACOUSTIC METHOD FOR NONDESTRUCTIVELY MONITORING THE INTERNAL TEMPERATURE OF OBJECTS

TECHNICAL FIELD

The present invention relates generally to a method for determining the internal temperature of objects having poor thermal conductance. More particularly, the present invention pertains to a method for monitoring the internal temperature of objects containing elastomeric materials, such as tires. More specifically, the present invention pertains to a method employing electroacoustics for nondestructively monitoring the internal temperature of a tire. The method of the present invention, which may utilize ultrasonics, can be practiced when the object, such as a tire is in actual operation, during heat induced curing by microwave frequency radiation, or at any other time.

BACKGROUND ART

The manufacture and operation of many objects is a function of the object's temperature. Where an object is formed of material that poorly conducts heat, as in the case of an elastomeric containing object such as a conventional pneumatic tire, the behavior of the object is generally a function of its internal temperature. Unfortunately it has often not heretofore been possible to directly and accurately ascertain such an object's internal temperature, particularly both during the object's manufacture and actual operation. As a result, control of the manufacturing process has not been as precise and certain as desired. Moreover, it has not been possible to collect data precisely reflective of the object's operational performance and characteristics.

With regard to conventional pneumatic tires, it is well known that an improperly cured tire may result in an unusable product. It thus becomes imperative to obtain accurate knowledge of the instantaneous internal temperature of such objects both during manufacture and operation.

All techniques for monitoring the temperature of elastomeric containing objects, such as tires may be broadly said to fall into two categories, those where measurements are made external to the tire and those where measurements are made internal of the tire. Since elastomeric materials are poor thermal conductors, a measurement of the external surface temperature of a tire will not be equal to and will not necessarily accurately reflect the internal tire temperature. Nevertheless, external measurement techniques (such as the use of infrared sensors and thermocouple transducers coupled to the tire surface) are popular because they are nondestructive, leaving the tire in an otherwise usable condition after the temperature testing process is complete, and may be utilized to monitor tire temperature when the tire is mounted and in actual use. Moreover, models have been developed to predict internal temperatures during curing of a tire where conventional thermal conduction curing is employed.

Presently known internal measurement techniques consist of the insertion of a transducer (as a thermocouple or needle pyrometer) directly into the interior of the tire at one or more preselected regions of interest. Although more accurate than externally obtained measurements, the insertion of a transducer into the tire generates its own heat as a result of friction, inducing a transient error in any obtained temperature measurement. Of course, the mechanical process of inserting a transducer into the interior of a tire takes time and often, if not virtually always, results in the destruction of the tire. Accordingly, this type of temperature measurement is economically wasteful, may be made only on a representative sampling of tires in production, and even then necessitates an interruption in the manufacturing routine.

As energy and labor costs have increased, manufacturers of tires have been attracted to the utilization of microwave frequency radiation to induce heating in tires. However, the nature of a microwave frequency electromagnetic field precludes the use of metallic transducers as thermocouples and needle pyrometers for temperature measurements. Since accurate models to predict, from external surface temperatures, the internal tire temperatures during curing induced with microwave frequency radiation are not known, one is presently incapable of accurately monitoring the temperature of a tire whose cure was induced with microwave frequency radiation, thus significantly retarding the growth of this curing technique. This lack of accurate knowledge as to the instantaneous internal temperature of tires whose cure is induced with microwave frequency radiation has caused manufacturers to limit the use of microwave frequency radiation to "preheating" tires to where their internal temperature is raised to a range where curing by conventional means may take place.

The use of electroacoustics for the determination of distance is well-known in many endeavors. Relying on the principle that for a constant temperature and pressure sound travels through a material at a substantially constant velocity (although this velocity differs for different materials), electroacoustic frequency (such as ultrasonic) pulses are generated and propogated through the material of interest, whereupon the distance the pulse traveled may be calculated by multiplying its velocity times the pulse propogation time. Implementing this technique, many devices are commercially available to determine the depth of bodies of water and any fish therein, to determine the profile of three dimensional objects hidden within other objects (as a fetus developing within its mother's body), and to determine the thickness of strips of materials, to name a few applications.

Heretofore, to my knowledge, no one has contemplated utilization of a change in the velocity of sound to determine temperature. In all instances of which I am aware, I have found that, over a typical working range of temperatures for curing of elastomeric containing materials or compounds, the velocity of sound therethrough varies substantially linearly with temperature. By measuring the time it takes an ultrasonic pulse to propogate through a reference tire at least at two different measured, internal temperatures, the method I have invented permits the continuous and nondestructive monitoring of internal temperature for all similar tires. Additionally, the method I have developed eliminates variations in ultrasonic pulse propogation times as a result of variations in tire thickness, permitting the continuous and nondestructive monitoring of internal temperature for any object having the same material as that of the reference tire material.

DISCLOSURE OF INVENTION

It is, therefore, an object of the present invention to provide a method for accurately determining the internal temperature of objects having poor thermal conductance without destruction of the objects.

It is even another object of the present invention to provide a method for accurately monitoring the internal temperature of objects containing elastomeric materials, such as tires, when the tire is in actual operation on a vehicle.

It is another object of the present invention to provide a method for accurately monitoring the internal temperature of objects containing elastomeric materials, such as tires, during curing thereof without destruction of the objects.

It is still another object of the present invention to provide a method for accurately monitoring the internal temperature of objects, as above, which may be made continuously without interruption of the curing or production process.

It is yet another object of the present invention to provide a method for accurately monitoring the internal temperature of objects, as above, which may be utilized with both microwave frequency radiation induced curing and thermal conduction curing.

It is even another object of the present invention to provide a method for accurately monitoring the internal temperature of objects, as above, which does not induce an error in temperature determination as a result of the operational placement of any measurement transducer.

It is a further object of the present invention to provide a method for accurately monitoring the internal temperature of objects, as above, which employs electroacoustics.

It is still a further object of the present invention to provide a method for accurately monitoring the internal temperature of objects, as above, in which the time taken by an electroacoustic pulse to propogate through the object is accurately correlated to the internal temperature of the object.

It is yet a further object of the present invention to provide a method for accurately monitoring the internal temperature of objects, as above, in which the time taken by an electroacoustic pulse to propogate through the object is accurately correlated to the internal temperature of the object independent of the dimensions of the object.

It is even a further object of the present invention to provide a method for accurately monitoring the internal temperature of objects, as above, in which the electroacoustic pulse is in the ultrasonic frequency range.

These and other objects and advantages of the present invention over existing prior art forms will become more apparent and fully understood from the following description in conjunction with the accompanying drawing.

In general, a method for nondestructively monitoring the internal temperature of objects having poor thermal conductance includes the initial steps of determining the internal temperature of a reference object or a representative portion thereof at a plurality of internal temperatures (T), measuring a plurality of pulse propogation times ($t_T$) taken by an electroacoustic frequency pulse signal to propogate through the reference object or a representative portion thereof at the plurality of internal temperatures (T), and establishing a relationship between the determined plurality of internal temperatures (T) and the associated plurality of pulse propogation times ($t_T$). Thereafter the unknown internal temperature ($T_U$) of the object to be monitored may be found by measuring the pulse propogation time ($t_{TU}$) taken by an electroacoustic frequency pulse signal to propogate therethrough and determining the unknown internal temperature ($T_U$) from correlating the measured pulse propogation time ($t_{TU}$) at the unknown internal temperature ($T_U$) to the relationship. Where the propogation paths in the sample object and object to be monitored have significantly different lengths, the aforesaid relationship may be made independent of the dimensions of both objects.

BRIEF DESCRIPTION OF THE DRAWINGS

FIG. 1 is a block diagram of a testing apparatus, together with a transducer and a single layer reference sample, permitting implementation of the present invention.

FIG. 2 is a top plan view of a single layer reference sample.

FIG. 5 is a top plan view of a multiple layer reference sample.

PREFERRED EMBODIMENT FOR CARRYING OUT THE INVENTION

Figure 3:
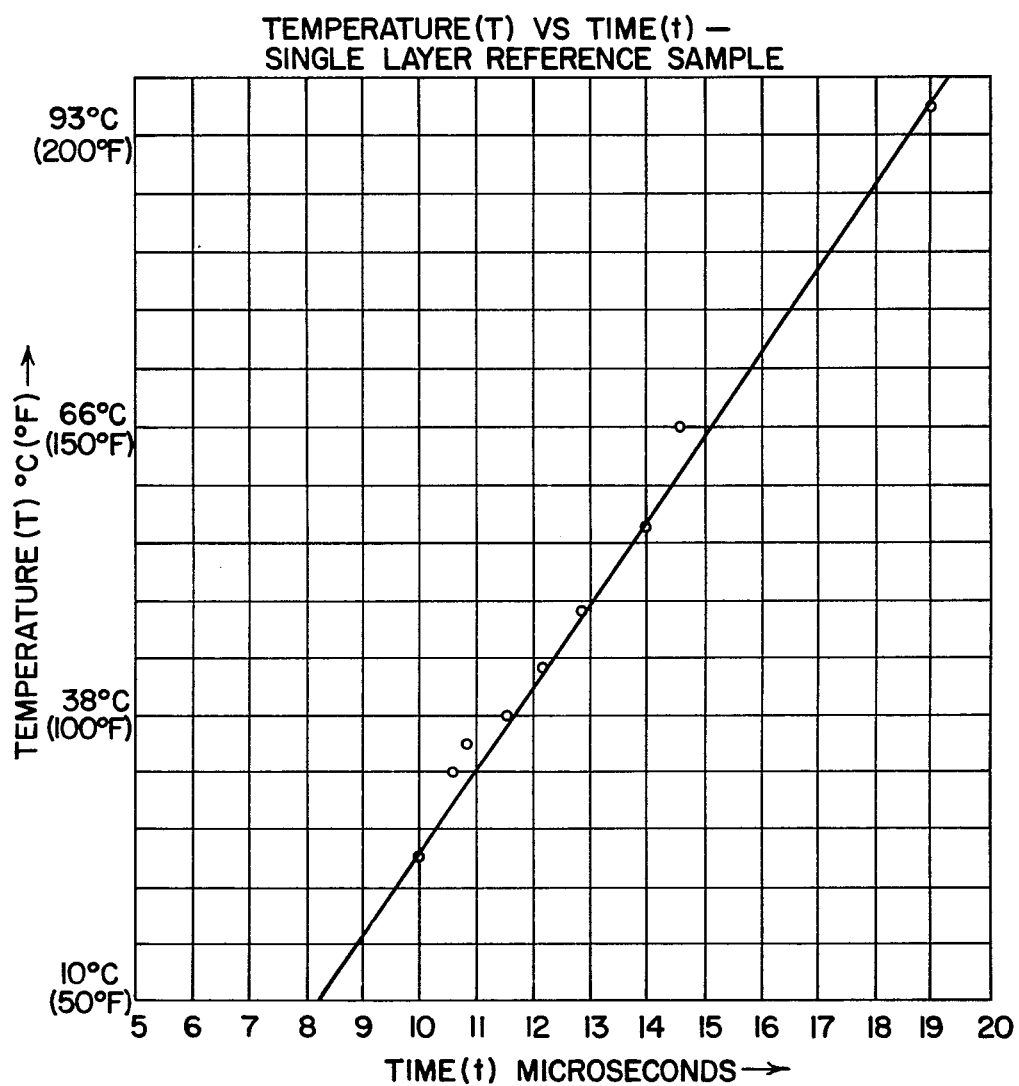
FIG. 3 is a graph of an exemplary internal temperature versus pulse propogation time relationship for a single layer reference sample as depicted in FIG. 2.

FIG. 1 illustrates a block diagram of an apparatus, generally demoninated by the numeral 12, which together with a transducer 14 of appropriate frequency response and a reference sample or object 16 is suitable for carrying out the method of the present invention providing nondestructive thermal analyses. One such testing apparatus 12 in commercial use is identified as the Nova Scope 2000 available from NDT Instruments, Huntington Beach, Calif., with a typical transducer 14 taking the form of a Model C6-2.5 MHz ultrasonic transducer available from Harisonic Laboratories Inc. of Stamford, Conn.

In the alternative, testing apparatus 12 may also be comprised of discrete components as an ultrasonic pulse generator 18 and a receiver 20, such as the Metrotek MP215 pulser and MR101 receiver, both available from Metrotek Ultrasonic Instruments, Richland, Wash. Testing apparatus 12 may further include an oscilloscope 22, such as Tektronix Type 422 oscilloscope, available from Tektronix Inc. of Beaverton, Ore., together with a central processor unit (CPU) or desk top computer 24, such as the Intel Model 8010 desk-top computer, available from Intel Corporation of Santa Clara, Calif. A final component of testing apparatus 12 could also include a display device 26 such as a seven-segment light emitting diode (LED) numeric readout, and a time counter such as a Tektronix Model DC505A counter. Although testing apparatus 12 or its components, together with the transducer 14 form no part of the present invention, it furnishes the means by which it can be carried out.

Reference sample or object 16 may, for example, be a piece of cured, partially cured or green rubber stock such as a durometer test button. FIG. 2 is a top plan view of an exemplary reference sample 16 of a single layer, with broken circle 28 indicating a typical placement thereupon of transducer 14.

In contrast thereto FIG. 5 is a perspective view of a multiple layer reference sample 30 representing a typical section from the tread portion of a radial truck tire having an outer tread layer 32 of compounded rubber, a first reinforcing belt or layer 34 of a rubberized composition having embedded therein a plurality of parallel reinforcing cords 36 of textile, glass or steel constructions. A second belt or layer 38 of rubber also has embedded therein a plurality of reinforcing cords 40. Similarly, a third belt or layer of rubber 42 has embedded therein reinforcing cords 44 while a fourth belt or layer of rubber material 46 has embedded therein a plurality of reinforcing cords 48. Below but adjacent to fourth belt or layer 46 is a layer of body ply material 52 of a rubberized composition having a plurality of reinforcing cords 54, of textile, glass or steel material embedded therein. Finally, below body ply material 52 there is a layer of innerliner material 56 of a low-permeability rubber composition. The actual compositions, thicknesses or arrangements of the various belts or layers as well as the types of reinforcing cords and the various bias angles thereof are of no importance relative to the nondestructive monitoring method of the present invention and are shown for illustrative purposes only, with tread layer 32 being the outermost layer, i.e., the layer in actual contact with the ground.

Operationally, the method of the present invention is straightforward. Essentially all that is necessary is to first determine the relationship between the time it takes an ultrasonic frequency pulse to propogate through the material of interest and its corresponding internal temperature. This need only be done with a single standard or reference sample (hereinafter called the "reference sample"). Thereafter, measurement at the same frequency with a transducer having similar characteristics of a "pulse propogation time" (hereinafter referred to as "PPT") on any similar object (hereinafter called the "monitored object") may be directly correlated to the determined relationship, and its internal temperature thereby found without need for destructive measurement internal to the object.

Since PPT is proportional to the distance through which the pulse must travel, for PPT measurements to directly reflect only changes in temperature, care must be taken to account for variations in the distance of the reference sample and monitored object pulse propogation paths. If the reference sample and monitored object have substantially the same dimensions and the transducer is similarly positioned on the monitored object as it was on the reference sample, the distance through which the pulse will travel will be substantially the same and no variations will be induced on this basis. However, these similarities are not always possible or desirable to obtain, as when only a representative portion of the material of the object to be monitored is available. In such instances the simple expedient of normalizing all PPTs with an arbitrarily selected standard PPT measurement will eliminate from the correlation variations that may occur as a result of differences in dimensions of the propogation paths in the reference sample and the monitored object.

Returning now to FIGS. 1, 2 and 3, a specific exemplary method in accordance with the present invention shall be delineated with reference to a single layer reference sample 16 of, for example, cured tire stock. Initially ultrasonic transducer 14, operatively interconnected with apparatus 12, is coupled with reference sample 16 by placing it in physical contact with top surface 15 in the manner shown in FIGS. 1 and 2. Thereafter, an ultrasonic frequency pulse of sufficient energy to fully penetrate reference sample 16, reflect off its inner or bottom surface 17 and return to the transducer at its top or outer surface 15, is generated by generator 12. Alternately, where it is desirable or expedient to utilize two transducers in aligned position on opposite sides or surfaces of reference sample 16 and suitable modifications have been made to apparatus 12, the present method will work successfully with propogation of the ultrasonic frequency pulse from one side or surface to the other. Receiver 20 furnishes a waveform to CPU 24 and oscilloscope 22 from which the PPT may be directly discerned as explained further hereinbelow.

These steps are repeated at two or more different internal temperatures upon reference sample 16 for each different elastomeric containing product or compound whose internal temperature one wishes to monitor. The actual internal temperature either must be known or accurately measured by conventional methods, such as a needle pyrometer or embedded thermocouple, at each of the internal temperatures at which PPTs are measured. Table I presents data empirically ascertained for a single layer reference sample 16 of cured tire stock with apparatus 12 operating at 2.25 MHz.

TABLE I

| Internal Temperature | Pulse Propogation Time (PPT) | PPT Ratio |
| --- | --- | --- |
| 76° F. (24° C.) | 10.0 μsecs | 1 |
| 90° F. (32° C.) | 10.6 μsecs | 0.943 |
| 95° F. (35° C.) | 10.8 μsecs | 0.930 |
| 100° F. (38° C.) | 11.6 μsecs | 0.862 |
| 108° F. (42° C.) | 12.2 μsecs | 0.820 |

TABLE I-continued

| Internal Temperature | Pulse Propogation Time (PPT) | PPT Ratio |
|---|---|---|
| 118° F. (48° C.) | 12.8 μsecs | 0.780 |
| 133° F. (56° C.) | 14.0 μsecs | 0.720 |
| 150° F. (66° C.) | 14.6 μsecs | 0.690 |
| 205° F. (96° C.) | 19.0 μsecs | 0.530 |

Thus, PPTs (identified with the symbol $t_T$) are obtained for a plurality of desired or known internal temperatures (T), with verification of these temperatures, where required, being made via any conventional monitoring equipment capable of accurately measuring the internal temperature of the reference object.

From the data in Table I, a graph may be made as in FIG. 3 showing the relationship of PPT to internal temperature of reference sample 16. If, as previously explained, the monitored tire stock and reference sample employ propogation paths of substantially equal length, the instantaneous internal temperature of the monitored tire may be found by measuring the instantaneous PPT and correlating this through the relationship in FIG. 3 to the actual internal temperature. For example, if at one instant in time the monitored tire stock is found by measurement to have a PPT of 13 μsec, the internal temperature of the tire stock at that instant in time may be found from the graph of FIG. 3 to be 120° F. (49° C.). Where desired, computer 24 may have this relationship stored in its memory and upon receipt of a PPT from receiver 20 automatically find the corresponding internal temperature and present it at LED numeric readout 26.

Figure 4:
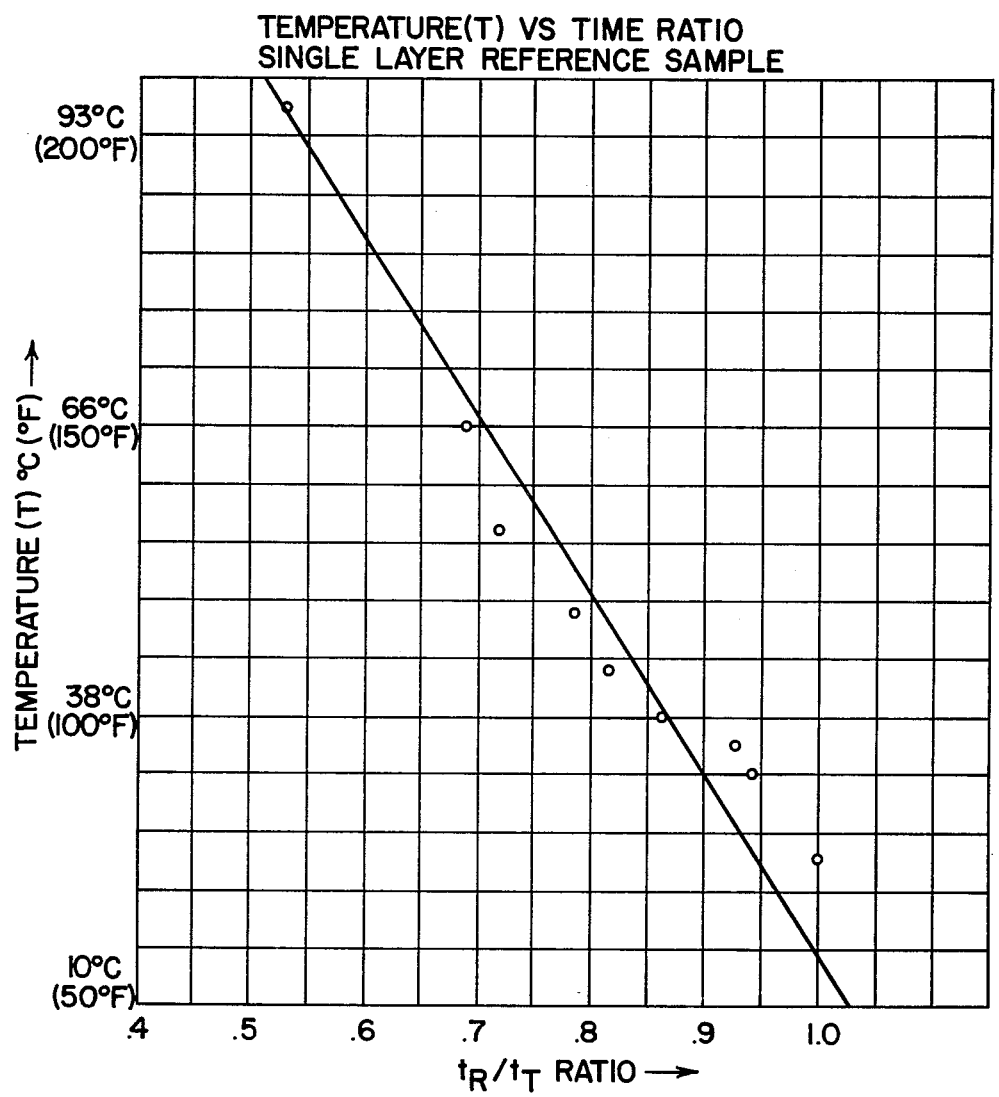
FIG. 4 is a graph of an exemplary internal temperature versus pulse propogation time ratio relationship for a single layer reference sample as depicted in FIG. 2. In the graph of FIG. 4 all elapsed times measured and plotted in FIG. 3 have been normalized by division with an arbitrarily selected reference pulse propogation time of 10 microseconds ($\mu$sec) which occurred when the internal temperature was 76° F. (24° C.).

Should the lengths of the propogation paths in the reference sample and monitored tire stock differ outside acceptable limits, resulting variations in PPTs may be eliminated by a simple expedient. First one of the PPTs for which the corresponding internal temperature ($T_R$) is known is selected (hereinafter called the "reference PPT" and identified as $t_R$), and all PPTs divided into the reference PPT to obtain a plurality of "PPT ratios" $t_R/t_T$. These ratios have been found for the example in Table I using the 10 μsec PPT measured when the internal temperature of the tire stock is 76° F. (24° C.) selected as the reference PPT, and are listed therein. From this data, a graph may be made as in FIG. 4 showing the relationship of PPTs normalized against the reference PPT to internal temperature of reference sample 16. The instantaneous internal temperature of the monitored tire stock may be found by measuring the PPT for the monitored tire stock at some unknown internal temperature ($T_U$), which PPT may be identified as $t_{TU}$, dividing this into the reference PPT so as to normalize $t_{TU}$, and correlating this normalized PPT through the relationship in FIG. 4 to the actual internal temperature of the tire stock. For example, if a monitored tire stock of a type similar to that of the reference sample 16 utilized to gather the data for FIGS. 3 and 4 is measured by apparatus 12 and found to have a PPT of 12.5 μsecs and this is divided into the preselected reference PPT of 10 μsecs, the resulting PPT ratio of 0.8 yields an internal temperature of 120° F. (49° C.) when applied to FIG. 4.

Figure 6:
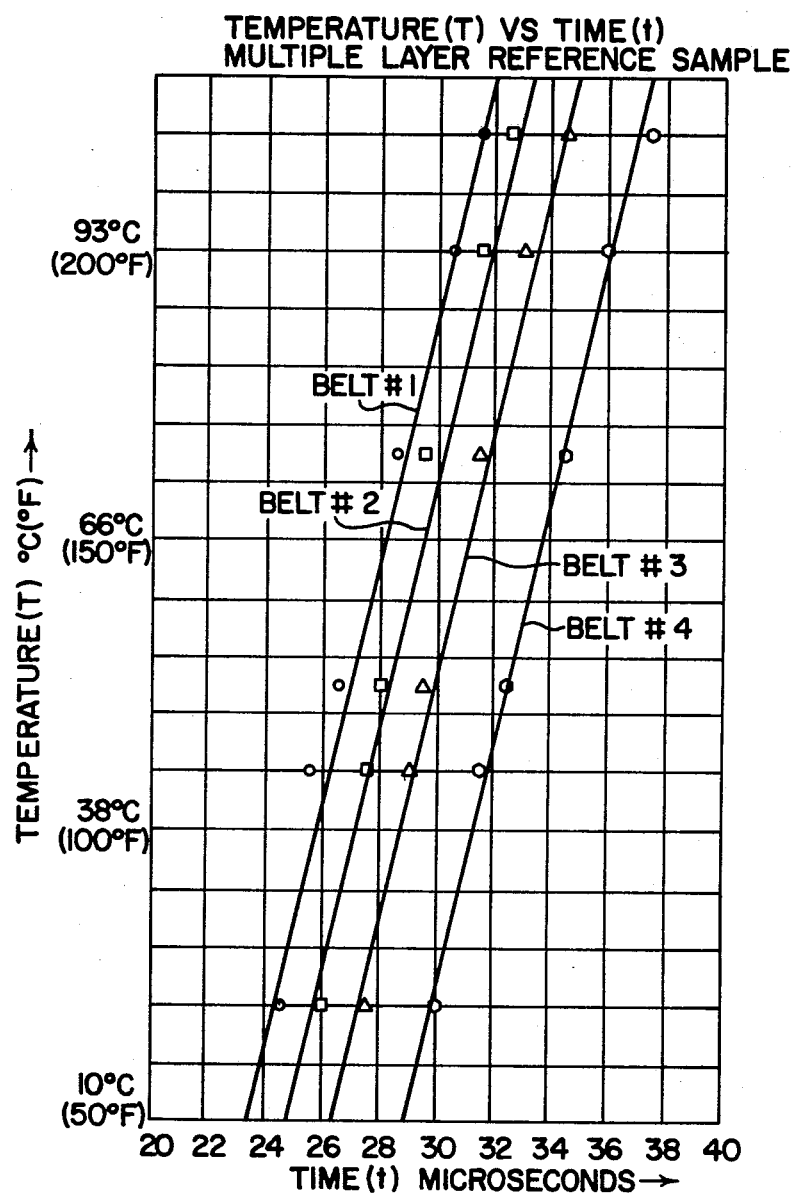
FIG. 6 is a graph of an exemplary internal temperature versus pulse propogation time relationship for a multiple layer reference sample as depicted in FIG. 5.
Figure 7:
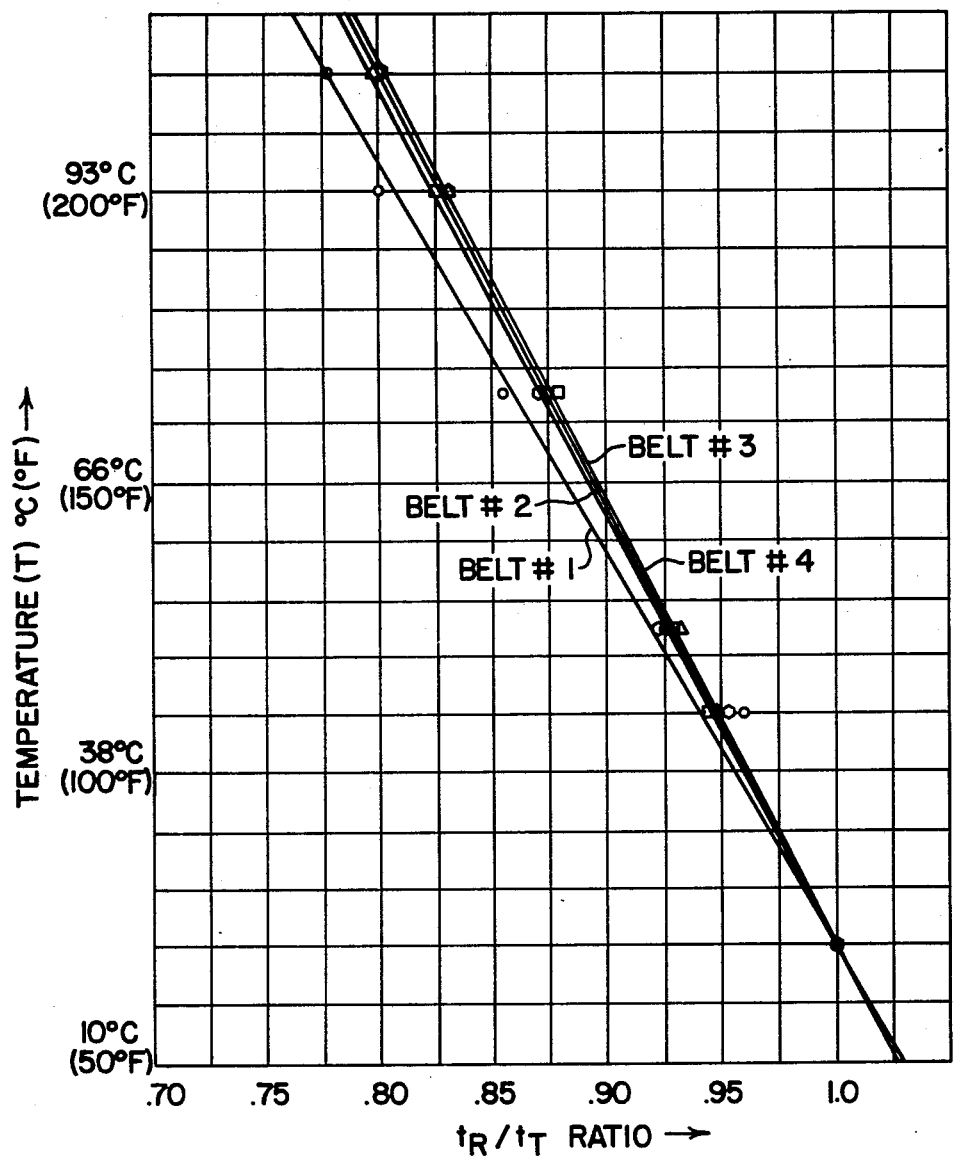
FIG. 7 is a graph of an exemplary internal temperature versus pulse propogation time ratio relationship for a multiple layer reference sample as depicted in FIG. 5. In the graph of FIG. 7 all pulse propogation times measured and plotted in FIG. 6 have been normalized by division with an arbitrarily selected reference pulse propogation time of 10 microseconds ($\mu$sec) which occurred when the internal temperature was 76° F. (24° C.).

The procedure for monitoring the internal temperature of objects having multiple layers therein as the radial truck tire section 30 shown in FIG. 5 is substantially the same as for single layer objects as reference sample 16. However, in this case each layer interface will result in a separate return echo to receiver 20, thereby providing a plurality of relationships between PPTs and internal temperature (as depicted in FIG. 6), and a similar plurality of relationships between normalized PPTs and internal temperature (as depicted in FIG. 7). From such relationships the instantaneous internal temperature of each layer may be monitored and a profile developed of temperature variations throughout the tire.

Figure 8:
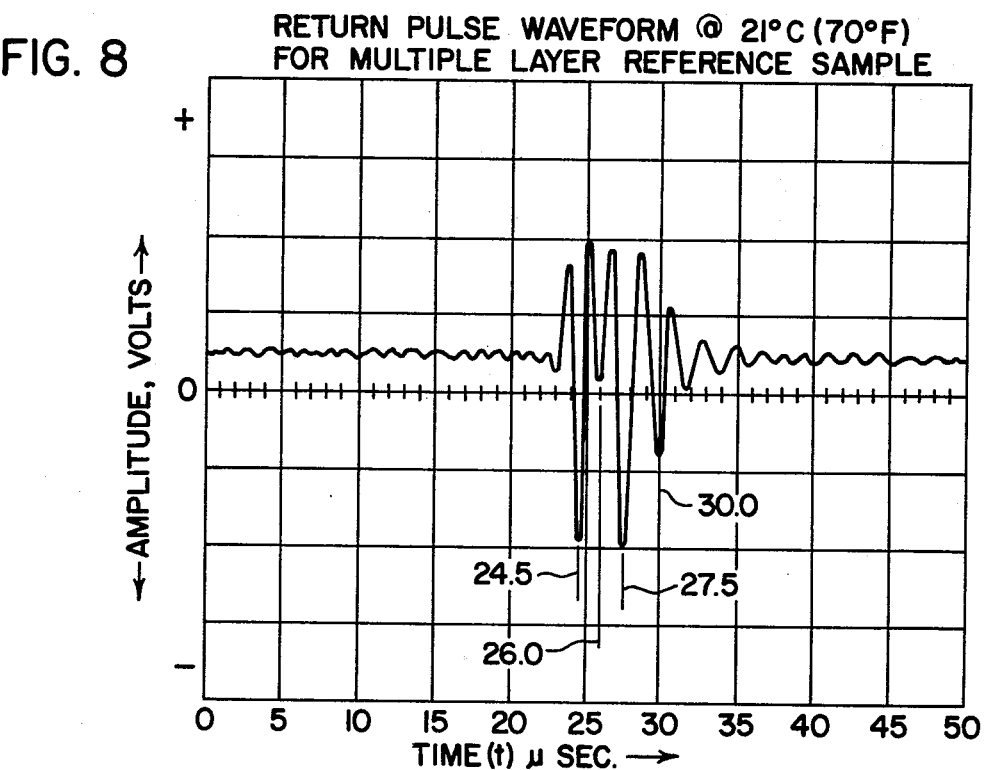
FIG. 8 is a somewhat schematic representation, as would be displayed by an oscilloscope, of the return ultrasonic pulse signal waveform as detected by the transducer when coupled with the multiple layer reference sample having an internal temperature within all layers of 70° F. (21° C.). The waveform of FIG. 8 is an approximation and is not necessarily to scale or coordinated in time with the waveform in FIG. 9.
Figure 9:
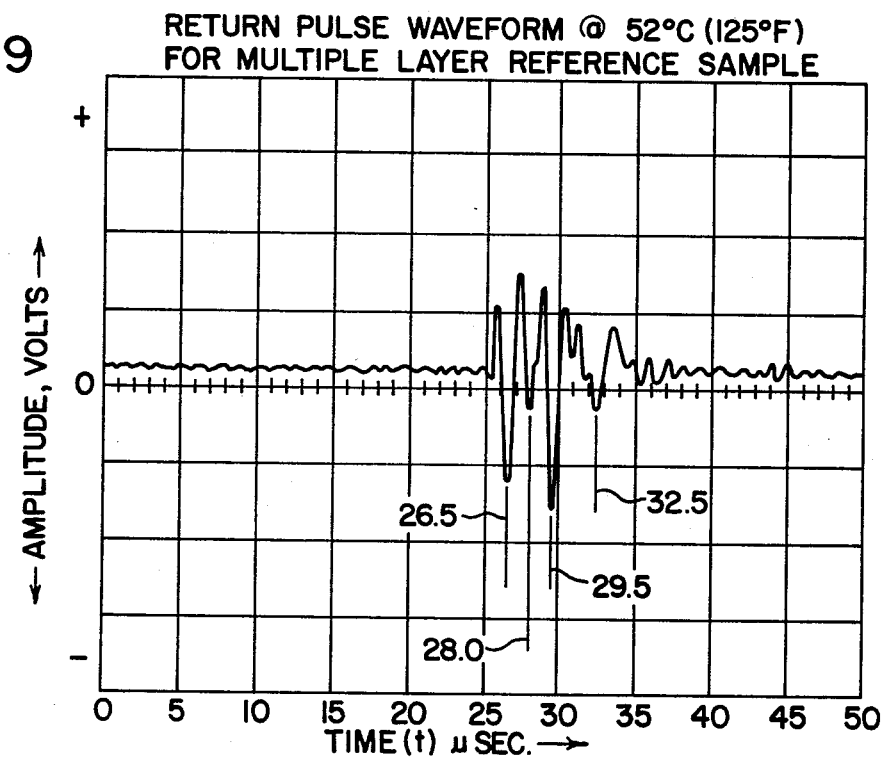
FIG. 9 is a somewhat schematic representation, as would be displayed by an oscilloscope, of the return ultrasonic pulse signal waveform as detected by the transducer when coupled with the multiple layer reference sample having an internal temperature within all layers of 125° F. (52° C.). The waveform of FIG. 9 is an approximation and is not necessarily to scale or coordinated in time with the waveform in FIG. 8.

FIGS. 8 and 9 present exemplary return ultrasonic pulse signal waveforms as would be shown on the screen of oscilloscope 22 with transducer 14 coupled to multiple layer reference sample 30. In FIG. 8 where all internal layers of reference sample 30 were actually measured at 70° F. (21° C.), PPTs for the four belts can be seen from successive points of maximum amplitude to have occurred at approximately 24.5, 26, 27.5 and 30 μsecs after the transmission of the ultrasonic pulse. In FIG. 9, where all internal layers of reference sample 30 were actually measured at 125° F. (52° C.), PPTs for the four belts can be similarly seen to have occurred at approximately 26.5, 28, 29.5 and 32.5 μsecs after the transmission of the ultrasonic pulse.

Of course, since the method of the present invention is not invasive to the monitored object, it will be appreciated that is is nondestructive and will cause minimal, if any, disturbance to any manufacturing process. Moreover, because this method can be completed in a fraction of a second, a continuous history of internal temperature changes may be developed. Since only external coupling of a transducer to the monitored object is required to effect the method of the present invention, the skilled artisan will understand that it may be applied to objects as tires in actual operation in addition to any manufacturing applications.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a method in accordance with the concept of the present invention, and reasonably equivalent thereto, will accomplish the objects of the present invention and otherwise substantially improve the art of nondestructively monitoring the internal temperature of objects having poor thermal conductance.

I claim:

1. A method for nondestructively monitoring the internal temperature of objects having poor thermal conductance, comprising the steps of:

determining the internal temperature of a reference object or a representative portion thereof at a plurality of internal temperatures (T);

noninvasively measuring a plurality of pulse propogation times ($t_T$) taken by an electroacoustic frequency pulse signal to propogate through said reference object or representative portion thereof at said plurality of internal temperatures (T);

establishing a relationship between said determined plurality of internal temperatures (T) and said plurality of pulse propogation times ($t_T$);

noninvasively measuring the pulse propogation time ($t_{TU}$) taken by an electroacoustic frequency pulse signal to propogate through the object to be monitored at an unknown internal temperature ($T_U$); and, determining said unknown internal temperature ($T_U$), said step of determining said unknown internal temperature ($T_U$) including the step of correlating said measured pulse propogation time ($t_{TU}$) to said relationship between said determined plurality of internal temperatures (T) and said plurality of pulse propogation times ($t_T$).

2. A method, as set forth in claim 1, wherein said step of noninvasively measuring the pulse propogation times ($t_T$) and said step of noninvasively measuring the pulse propogation time ($t_{TU}$) are performed external to the object during any operational condition.

3. A method, as set forth in claim 2, wherein said step of noninvasively measuring the pulse propogation times ($t_T$) and said step of noninvasively measuring the pulse propogation time ($t_{TU}$) do not induce an error in the internal temperature determination as a result of the operational placement of any measurement transducer.

4. A method, as set forth in claim 1, wherein said step of establishing a relationship includes the step of making said relationship independent of the dimensions of the object.

5. A method, as set forth in claim 4, wherein said step of establishing a relationship further includes the step of selecting one of said determined plurality of internal temperatures (T) and its associated said pulse propogation time ($t_T$) as a reference, respectively designated as $T_R$ and $t_R$.

6. A method, as set forth in claim 5, wherein said step of making said relationship independent of the dimensions of the object includes the step of normalizing said plurality of pulse propogation times ($t_T$) against said selected reference pulse propogation time ($t_R$).

7. A method for nondestuctively monitoring the internal temperature of objects having poor thermal conductance, comprising the steps of:

determining the internal temperature of a reference object or a representative portion thereof at a plurality of internal temperatures (T);

measuring a plurality of pulse propogation times ($t_T$) taken by an electroacoustic frequency pulse signal to propogate through said reference object or representative portion thereof at said plurality of internal temperatures (T);

establishing a relationship between said determined plurality of internal temperatures (T) and said plurality of pulse propogation times ($t_T$), said step of establishing a relationship including the steps of
making said relationship independent of the dimensions of the object, and
selecting one of said determined plurality of internal temperatures (T) and its associated said pulse propogation time ($t_T$) as a reference, respectively designated as $T_R$ and $t_R$, said step of making said relationship independent of the object including the step of normalizing said plurality of pulse propogation times ($t_T$) against said selected reference pulse propogation time ($t_R$), said step of normalizing said plurality of pulse propogation times ($t_T$) including the step of finding a plurality of pulse propogation time ratios by dividing each of said plurality of pulse propogation times ($t_T$) into said selected reference pulse propogation time ($t_R$);

measuring the pulse propogation time ($t_{TU}$) taken by an electroacoustic frequency pulse signal to propogate through the object to be monitored at an unknown internal temperature ($T_U$); and, determining said unknown internal temperature ($T_U$), said step of determining said unknown internal temperature ($T_U$) including the step of correlating said measured pulse propogation time ($t_{TU}$) to said relationship between said determined plurality of internal temperatures (T) and said plurality of pulse propogation times ($t_T$).

8. A method, as set forth in claim 7, wherein said step of making said relationship independent of the dimensions of the object further includes the step of establishing a relationship between said determined plurality of internal temperatures (T) and said determined plurality of pulse propogation time ratios ($t_R/t_T$).

9. A method, as set forth in claim 8, wherein said step of determining said unknown internal temperature ($T_U$) further includes the step of normalizing said pulse propogation time ($t_{TU}$) against said selected reference pulse propogation time ($t_R$).

10. A method, as set forth in claim 9, wherein said step of normalizing said pulse propogation time ($t_{TU}$) includes the step of finding a pulse propogation ratio by dividing the pulse propogation time ($t_{TU}$) into said selected reference pulse propogation time ($t_R$).

11. A method, as set forth in claim 10, wherein said step of determining said unknown internal temperature ($T_U$) further includes the step of correlating said pulse propogation ratio ($t_R/t_{TU}$) to said relationship between said determined plurality of internal temperatures (T) and said determined plurality of pulse propogation time ratios ($t_R/t_T$).

12. A method, as set forth in claim 11, wherein said step of measuring the pulse propogation time ($t_T$) includes the step of generating an ultrasonic frequency pulse signal, and said step of measuring the pulse propogation time ($t_{TU}$) includes the step of generating an ultrasonic frequency pulse signal.

* * * * *